(12) United States Patent
Barnes et al.

(10) Patent No.: US 7,248,302 B1
(45) Date of Patent: Jul. 24, 2007

(54) PICTURE SIGNAL PROCESSING

(75) Inventors: Robert A. Barnes, Caterham (GB); Dirk Piepers, Brugge (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1394 days.

(21) Appl. No.: 09/675,251

(22) Filed: Sep. 29, 2000

(30) Foreign Application Priority Data

Sep. 30, 1999 (EP) .................................. 99307734

(51) Int. Cl.
*H04N 7/00* (2006.01)
(52) U.S. Cl. ...................................... 348/474; 348/607
(58) Field of Classification Search ................ 348/473, 348/474, 476–479, 460, 625, 607, 606, 189; 375/240.02, 240.07
See application file for complete search history.

(56) References Cited

U.S. PATENT DOCUMENTS

| | | | | |
|---|---|---|---|---|
| 3,706,843 A * | 12/1972 | Laub | ........................ | 348/424.1 |
| 4,897,716 A * | 1/1990 | Drewery et al. | ............. | 348/452 |
| 4,933,765 A * | 6/1990 | Schiff et al. | ................. | 348/474 |
| 5,253,060 A | 10/1993 | Welmer et al. | .............. | 358/140 |
| 5,384,849 A * | 1/1995 | Jeong | ....................... | 348/425.2 |
| 5,402,187 A * | 3/1995 | Ezaki | .......................... | 348/474 |
| 5,627,592 A * | 5/1997 | Tichelaar et al. | ........ | 348/429.1 |
| 5,654,743 A * | 8/1997 | Hu et al. | ..................... | 345/213 |
| 5,684,540 A * | 11/1997 | Kitahara et al. | .......... | 348/432.1 |
| 6,078,360 A * | 6/2000 | Doornhein et al. | ......... | 348/473 |

FOREIGN PATENT DOCUMENTS

| | | |
|---|---|---|
| EP | 0843468 A2 | 5/1998 |
| EP | 0843468 A3 | 5/1998 |
| WO | 9602895 A1 | 2/1996 |
| WO | WO9746022 | 12/1997 |
| WO | 9832277 A2 | 7/1998 |
| WO | 9832277 A3 | 7/1998 |
| WO | WO9832277 | 7/1998 |

\* cited by examiner

*Primary Examiner*—Michael H. Lee

(57) ABSTRACT

In a picture signal processing method, an analog picture signal (APS1, APS2) is processed (PSP) in dependence on a quality indication (QI1, QI2) relating to the analog picture signal (APS1, APS2) and received together with the analog picture signal (APS1, APS2). Preferably, the analog picture signal (APS1, APS2) has been obtained from a digital picture signal that has been encoded at a bit-rate and/or at a compression ratio and/or at a quantization level, wherein the quality indication (QI1, QI2) is the bit-rate and/or the compression ratio and/or the quantization level.

13 Claims, 1 Drawing Sheet

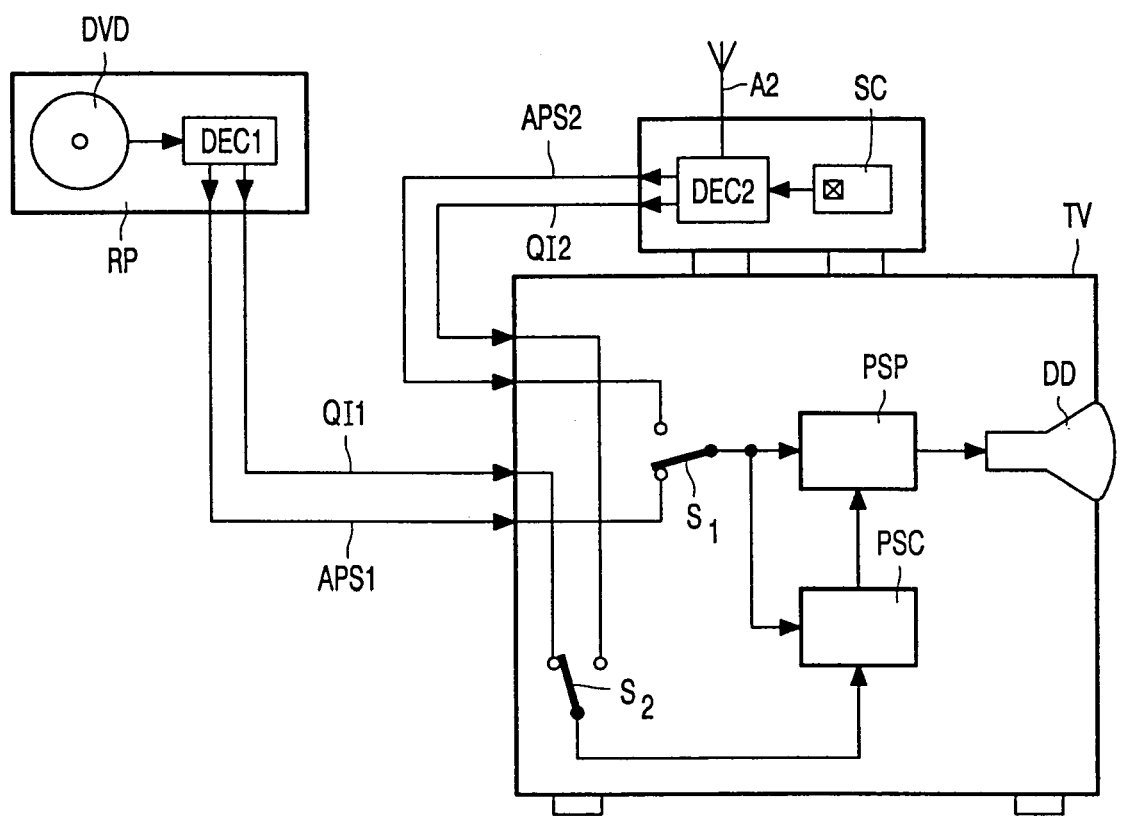

PICTURE SIGNAL PROCESSING

BACKGROUND OF THE INVENTION

1. Field of the Invention

The invention relates to a picture signal processing method and device, a picture signal supplying method and device, a television receiver, a record player and a picture signal receiver.

2. Description of the Related Art

It is known to use motion vectors transmitted as part of an MPEG signal both in an MPEG decoder and in post-processing circuitry to enhance an MPEG decoder output signal, e.g. by doubling the field-rate. See International Patent Application No. WO-A-97/46022, section V, corresponding to U.S. Pat. No. 6,278,736.

SUMMARY OF THE INVENTION

It is, inter alia, an object of the invention to provide an improved picture signal processing. To this end, the invention provides a picture signal processing method and device, a picture signal supplying method and device, a television receiver, a record player and a picture signal receiver.

In a picture signal processing method in accordance with an aspect of the invention, an analog picture signal is processed in dependence on a quality indication relating to the analog picture signal and received together with the analog picture signal. Preferably, the analog picture signal has been obtained by decoding a digital picture signal that has been obtained by encoding at a bit-rate and/or at a compression ratio and/or at a quantization level, wherein the quality indication is the bit-rate and/or the compression ratio and/or the quantization level and/or other information about the encoding or decoding.

These and other aspects of the invention will be apparent from and elucidated with reference to the embodiments described hereinafter.

BRIEF DESCRIPTION OF THE DRAWING

The includes a sole FIGURE showing a block diagram of a (DVD) record player, a picture signal receiver (set-top box) and a television receiver in accordance with the present invention.

DESCRIPTION OF THE PREFERRED EMBODIMENTS

A record player RP comprises a decoder DEC1 (such as an MPEG decoder, alternatives are possible) for decoding a digital picture signal retrieved from a storage medium, such as a digital versatile disk (DVD). Other digital record media, such as tape, are alternatively possible. The record player RP may have an antenna input for receiving a digital picture signal. In that manner, the decoder DEC1 can be used both for stored signals and for signals received from air (or thru cable).

In accordance with the present invention, the decoder DEC1 does not just supply a decoded first analog picture signal APS1, but also a first quality indication QI1 corresponding to the first analog picture signal APS1. Preferably, the first quality indication QI1 is the bit-rate and/or the compression ratio and/or the quantization level at which the digital picture signal has been encoded and/or other information about the encoding or decoding, such as information about the level of compression via inverse quantization process and/or quantizer matrix (for intra and non-intra pictures) when the default ones are not used and/or intra-dc-precision and/or information when a decoding error happened.

The drawing further shows a picture signal receiver in the form of a set-top box STB comprising a reader for a smart card SC and a decoder DEC2 corresponding to the decoder DEC1 for decoding a digital picture signal received from an antenna A2 or thru cable. The decoder DEC2 supplies a second analog picture signal APS2 and a corresponding second quality indication QI2.

A television receiver TV includes inputs for the analog picture signals APS1, APS2 and the corresponding quality indications QI1, QI2. The connections between the record player RP and the TV set may be thru a well-known SCART cable for a parallel transmission of the analog picture signal APS1/2 and the corresponding quality indication QI1/2, or thru a serial connection such as USB. As a further alternative, the quality indication Q1/2 may be transmitted within the corresponding analog picture signal APS1/2, e.g., in a teletext line of the analog picture signal APS1/2. A switch S1 selects the first analog picture signal APS1 or the second analog picture signal APS2 to obtain a selected analog picture signal. A switch S2 selects the first quality indication QI1 or the second quality indication QI2 to obtain a selected quality indication. The switches S1, S2 may belong to a single electronic switch unit. The selected analog picture signal is subjected to a picture signal processing PSP, such as a picture signal enhancement, e.g., a peaking operation, noise reduction operation, MPEG artifact reduction operation, coring operation or histogram operation. The picture signal processing PSP is controlled by a picture signal control in dependence on the selected analog picture signal and the selected quality indication. The resulting processed picture signal is displayed on a display device DD.

The invention is based on the recognition that sending a quality indication with an analog picture signal allows a TV to determine the characteristics of the source material and, hence, make an informed selection of algorithm. A better picture quality will result from the application of a more appropriate processing to the signal. Giving a picture signal processing unit the information it needs to enable it to do the appropriate optimization, prevents it from "optimizing" a picture that is already OK, or from "optimizing" it in the wrong way. For example, if the quality of the analog picture signal is low, because the digital picture signal from which the analog picture signal has been retrieved had been encoded at a low quantization level, a low bit-rate and/or a high compression ratio, a picture signal enhancement operation, such as, a peaking or histogram operation to improve sharpness and/or contrast, would only render the blocking artifacts more visible. So, if the quality indication indicates a low quality, a peaking operation is preferably switched off. On the other hand, mosquito noise present in a low-quality signal could be reduced by appropriately adjusting a noise reduction operation forming part of the picture signal processing PSP in dependence upon the quality indication. The TV can accommodate different sources, with different (and possibly dynamically changing) signal qualities. While in the embodiment, the TV receiver has two inputs (APS1, QI1) and (APS2, QI2), it is not necessary to have two sources in the system for the invention to have a benefit.

It should be noted that the above-mentioned embodiments illustrate rather than limit the invention, and that those skilled in the art will be able to design many alternative embodiments without departing from the scope of the appended claims. The record player RP may have recording facilities, and the notion record player includes any apparatus that is able to play and decode a recorded digital picture signal to obtain an analog picture signal plus a corresponding quality indication. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A picture signal processing method comprising the steps:
   receiving an analog picture signal and a quality indication relating to the analog picture signal; and
   processing the analog picture signal in dependence on the quality indication,
   wherein the analog picture signal is formed by decoding a digital picture signal having been encoded at a bit-rate and/or at a compression ratio and/or at a quantization level, and wherein the quality indication is the bit-rate and/or the compression ratio and/or the quantization level and/or other information about the encoding or decoding.

2. The method as claimed in claim 1, wherein the processing step includes a picture enhancement operation.

3. The method as claimed in claim 2, wherein the picture enhancement operation is a sharpness and/or contrast improving operation.

4. The method as claimed in claim 2, wherein the picture enhancement operation is a noise or encoding artifact reduction operation.

5. A picture signal processing device, comprising:
   means for receiving an analog picture signal and a quality indication relating to the analog picture signal; and
   means for processing the analog picture signal in dependence on the quality indication,
   wherein the analog picture signal is formed by decoding a digital picture signal having been encoded at a bit-rate and/or at a compression ratio and/or at a quantization level, and wherein the quality indication is the bit-rate and/or the compression ratio and/or the quantization level and/or other information about the encoding or decoding.

6. A television receiver comprising:
   the picture signal processing device as claimed in claim 5 for furnishing a processed picture signal; and
   means for displaying the processed picture signal.

7. The picture signal processing device as claimed in claim 5, wherein the processing means includes means for carrying out a picture enhancement operation.

8. The picture signal processing device as claimed in claim 7, wherein the means for carrying out the picture enhancement operation includes means for carrying out a sharpness and/or contrast improving operation.

9. The picture signal processing device as claimed in claim 7, wherein the means for carrying out the picture enhancement operation includes means for carrying out a noise or encoding artifact reduction operation.

10. A picture signal supplying method comprising the steps of:
    receiving a digital picture signal having been encoded at a bit-rate and/or at a compression ratio and/or at a quantization level;
    decoding the digital picture signal to form an analog picture signal;
    generating a quality indication related to the analog picture signal, said quality indication being the bit-rate and/or the compression ratio and/or the quantization level and/or other information about the encoding or decoding;
    supplying the analog picture signal; and
    supplying the quality indication.

11. A picture signal supplying device, comprising:
    an input to which a digital picture signal is applied, said digital picture signal having been encoded at a bit-rate and/or at a compression ratio and/or at a quantization level;
    means for decoding the digital picture signal to form an analog picture signal;
    means for generating a quality indication related to the analog picture signal, said quality indication being the bit-rate and/or the compression ratio and/or the quantization level and/or other information about the encoding or decoding;
    means for supplying the analog picture signal; and
    means for supplying the quality indication.

12. A record player comprising:
    means for retrieving a digital picture signal from a record; and
    the picture signal supplying device as claimed in claim 11.

13. A picture signal receiver comprising:
    means for receiving a digital picture signal; and
    the picture signal supplying device as claimed in claim 11.

* * * * *